(12) United States Patent
Takano et al.

(10) Patent No.: US 6,566,779 B2
(45) Date of Patent: May 20, 2003

(54) COIL WINDING FOR DC MACHINE

(75) Inventors: Tadashi Takano, Shuuchi-gun (JP); Hideaki Takahashi, Shuuchi-gun (JP)

(73) Assignee: Kabushiki Kaisha Moric, Morimachi (JP)

( * ) Notice: Subject to any disclaimer, the term of this patent is extended or adjusted under 35 U.S.C. 154(b) by 0 days.

(21) Appl. No.: 09/681,711

(22) Filed: May 24, 2001

(65) Prior Publication Data

US 2001/0048262 A1 Dec. 6, 2001

(30) Foreign Application Priority Data

Jun. 2, 2000 (JP) ........................................ 2000-165735

(51) Int. Cl.[7] ............................ H02K 3/52; H02K 11/00
(52) U.S. Cl. ......................... 310/214; 310/218; 310/71; 310/194; 310/254
(58) Field of Search ............................... 310/214, 216, 310/217, 218, 71, 91, 194, 254, 258, 259, DIG. 6; 29/605, 606, 596

(56) References Cited

U.S. PATENT DOCUMENTS

| | | | | | |
|---|---|---|---|---|---|
| 418,853 A | * | 1/1890 | Storey | ........................ | 310/218 |
| 2,711,008 A | * | 6/1955 | Smith | ........................ | 310/218 |
| 3,737,693 A | * | 6/1973 | Mishima | ........................ | 310/67 |
| 4,182,026 A | * | 1/1980 | Searle | ........................ | 29/596 |
| 4,403,401 A | * | 9/1983 | Rosenberry | ........................ | 29/596 |
| 4,454,554 A | * | 6/1984 | Coleman | ........................ | 361/41 |
| 4,529,900 A | * | 7/1985 | Uzuka | ........................ | 310/43 |
| 4,816,710 A | * | 3/1989 | Silvaggio et al. | ........................ | 310/194 |
| 5,793,132 A | * | 8/1998 | Hirose et al. | ........................ | 310/71 |

* cited by examiner

*Primary Examiner*—Dang Dinh Le
(74) *Attorney, Agent, or Firm*—Ernest A. Beutler

(57) ABSTRACT

An improved armature winding arrangement for a rotating electrical machine such as a specifically illustrated DC motor for driving a vehicle wheel. The assembly is such that the armature core can be formed from two laminated pieces that are rigidly connected to each other and held against axial movement. This eliminates the need for bonding adhesive. In addition, an improved bobbin arrangement is employed for both permitting attachment of a wiring plate directly to the core but also for retaining the ends of the individual windings to prevent them from becoming loose either during assembly or in operation.

14 Claims, 6 Drawing Sheets

COIL WINDING FOR DC MACHINE

BACKGROUND OF INVENTION

This invention relates to a coil winding for a DC machine and more particularly to an improved, simplified and lower cost coil-winding assembly for such machines.

It has been the practice to provide a coil winding for DC machines wherein the winding core is comprised of radially spaced inner and outer annular elements. The armature cores are formed as extending teeth on one or the other of these elements. As is well known, the core is preferably formed from a plurality of laminated electromagnetic steel plates such as silicate steel or the like. The outer periphery of the inner element is shrunk fit into the inner periphery of the outer element so as to form a complete assembly.

Prior to this, however, coil windings are formed on the core teeth. This is frequently done by placing insulating bobbins around which the coils have been wound on the core teeth before the two elements are shrunk fit together.

Although this expedient provides a very good assembly, there are some difficulties, which may arise. The shrink fit, for example, may result in imprecise axial positioning between the two elements. This problem is aggravated by the lamination of the elements.

In order to maintain the elements in their position, it has been proposed to bond the elements to each one once they have been shrunk fit. This is generally done by embedding them in a resin material. However, this still does not provide a rigid enough connection. For example, this type of mechanism is frequently used as a DC motor to power a wheel of a vehicle. The vibrations associated with such applications however, can cause a slipping between the elements and affects the coupling accuracy between the bobbins and the magnetic poles.

In addition, it is frequently the practice to embed or immerse the electric motor in oil for improving its cooling. However, the lubricating oil used may attack the resin employed for the bonding and cause the connection to become weakened.

It is, therefore, a principal object to this invention to provide an improved coil winding for an electric machine wherein the coil winding can be formed from interconnected radially inner and outer annular elements, one of which has extending core teeth.

It is a further object to this invention to provide a more rigid location arrangement for locating the inner and outer elements relative to each other that does not necessarily require adhesive bonding.

With the aforenoted construction, it is necessary to connect the coil windings to each other in a predetermined fashion and to supply or extract electrical power from them in a timed sequence when phased windings are employed. This requires a contact plate or wiring board to which the coil ends are connected. Previously, these windings boards have been mounted separately and complicate the arrangement for making the wiring connections.

It is, therefore, a still further object to this invention to provide an improved coil winding for an electric machine wherein the associated wiring board can be conveniently and rigidly mounted relative to the windings and thus improve the physical retention of the elements relative to each other.

In connection with extracting the wiring from the coil windings and connecting it to the control circuit, there is a risk that the coil ends can become loose and shift. This will cause the entire winding to loosen and may result in breaking of the electrical connections.

It is, therefore, a still further object to this invention to provide an improved bobbin arrangement for use with a coil winding of this type and wherein the bobbins provide a retainer assembly for retaining the ends of the wires of the coil windings.

SUMMARY OF INVENTION

A first feature of this invention is adapted to be embodied in an electrical coil winding assembly for a rotating electrical machine. The winding assembly comprises a core that is formed of annular radially inner and outer elements, which form a plurality of radially extending armature cores. Electrical coils are wound around the armature cores. Circumferentially spaced and radially extending interengaging parts on the core elements maintain the axial relationship between the core elements.

Another feature of the invention is also adapted to be embodied in an electrical coil winding assembly for a rotating electrical machine. In accordance with this feature of the invention, the winding assembly comprises a core that is formed by annularly radially inner and radially outer elements forming a plurality of radially extending armature cores. Each of a plurality of bobbins surrounds a respective one of the armature cores. Electrical coils are wound around each of the bobbins. The bobbins and respective electrical coils are detachably connected to the core element that forms the armature cores by retaining clips. At least some of the retaining clips have end portions that extend in an axial direction beyond the core elements and a wiring plate is carried by such retaining clip end portions.

Yet another feature of the invention is also adapted to be embodied in an electrical coil winding assembly for a rotating electrical machine. The assembly comprises a core that is formed by annular, radially inner and radially outer elements that form a plurality of radially extending armature cores. Each of a plurality of bobbins around which the respective electrical coils are wound surrounds a respective one of the armature cores. The bobbins have portions that form a retainer for retaining the conductor ends of the respective coils against movement.

DETAILED DESCRIPTION

Figure 1:
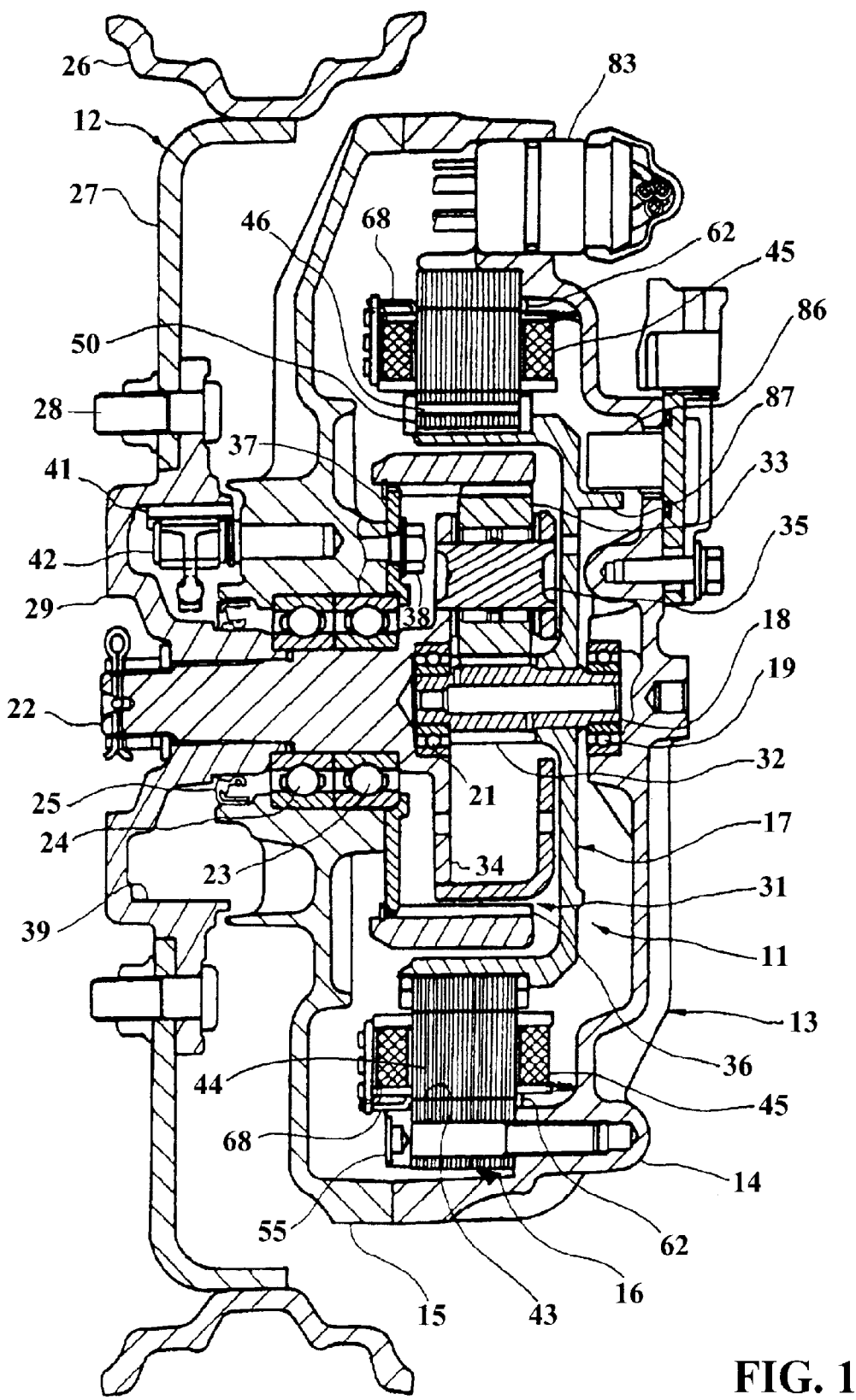
FIG. 1 is a cross sectional view of vehicle wheel driven by an electric motor constructed in accordance with an embodiment of the invention.

Referring now in detail to the drawings and initially primarily to FIG. 1, an electric motor constructed in accordance with an embodiment of the invention is indicated generally by the reference numeral 11. The electric motor 11 is used in the exemplary, described embodiment for powering a vehicle wheel 12 for driving an associated vehicle (not shown) along the ground. Although the invention is described in conjunction with an electric motor, it should be readily apparent that the invention can be utilized in conjunction with other rotating electrical machines such as electrical generators. The specific embodiment illustrated, however, is one in which a number of the problems noted in the Background section are particularly prevalent and are solved by the construction.

The motor 11 is contained within a motor case assembly, indicated generally by the reference numeral 13 that is affixed in a suitable manner to the aforenoted associated vehicle. This motor case is comprised of an inner housing element 14 and an outer housing element 15, which are secured to each other in a suitable manner and which enclose the motor 11. A suitable lubricant is filled into the motor case assembly 13.

The motor 11 is comprised of a stator, which forms a winding assembly, which is indicated generally by the reference numeral 16, and a rotor, indicated generally by the reference numeral 17. The rotor 17 is fixed to a stub shaft 18. The stub shaft 18 is, in turn, journalled in the inner housing element 14 by a first anti-friction bearing 19. A second anti-friction bearing 21 journals the stub shaft 18 and rotor 17 on an axial shaft 22. The axial shaft 22 is, in turn, journalled in the outer housing element 15 by a pair of bearings 23 and 24. An oil seal 25 encloses the bearings and the interior of the motor case assembly 13 to prevent leakage of the lubricant contained therein.

The wheel 12 is comprised of a rim portion 26 that mounts a suitable tire (not shown) and which is affixed to a disk portion 27. The disk portion 27 is, in turn, connected by fasteners 28 to a hub 29. The hub 29 has a splined connection to the axial shaft 22 and hence, the wheel 12 rotates with this axial shaft 22.

A step-down planetary transmission interconnects the motor rotor 17 with the axle shaft 22 for driving it and the wheel 12. This step-down transmission is of the planetary type and is indicated generally by the reference numeral 31. It is comprised of a sun gear 32 that is fixed for rotation with the stub shaft 18 and is enmeshed with a plurality of planet gears 33 that are carried by a carrier 34. The carrier 34 is formed in part integrally with the axial shaft 22.

These planet gears 33 are journalled on the carrier 34 by a plurality of stub shafts 35. The exterior periphery of these planet gears 33 are enmeshed with a ring gear 36 that is fixed relative to the motor outer housing element 15 by a carrier plate 37 that is fixed to the outer housing element 15 by threaded fasteners 38.

The wheel 12 also forms an integral drum brake assembly. To this end, the hub 29 is formed with a drum brake inner surface 39 which is formed integrally with it and which is engaged by brake shoes 41 carried by actuator elements 42. These actuator elements 42 are operated by a suitable brake actuator for bringing the brake shoes 41 into engagement with the drum brake inner surface 39 for halting the rotation of the wheel 12.

It should be understood that the foregoing description is primarily made to provide an environment in which the invention can be utilized. The invention deals primarily with the construction of the electric motor 11 and particularly the stator or armature winding assembly 16 thereof which forms a plurality of armature cores. These armature cores are formed from laminated plates comprised of an outer member 43 and an inner member 44 which are secured together in a manner to be described. The inner member 44 forms a plurality of poles around which coil windings 45 are formed in a manner, which will be described in more detail shortly by reference to FIGS. 2 through 6.

These coil windings 45 cooperate with permanent magnets 46 that are affixed to the periphery of the motor rotor 17 via a laminated electromagnetic steel plate annular magnetic bushing 50. It should be noted that the rotor 17 is primarily formed from aluminum or an aluminum alloy. These permanent magnets 46 are arranged so as to have alternate poles alternating in a circumferential direction around the rotor 17 of the motor 11 and in a preferred embodiment there are 12 permanent magnets 46. The permanent magnets 46 are formed from a material with a large magnetic flux density, such as neodymium-iron-boron.

Figure 4:
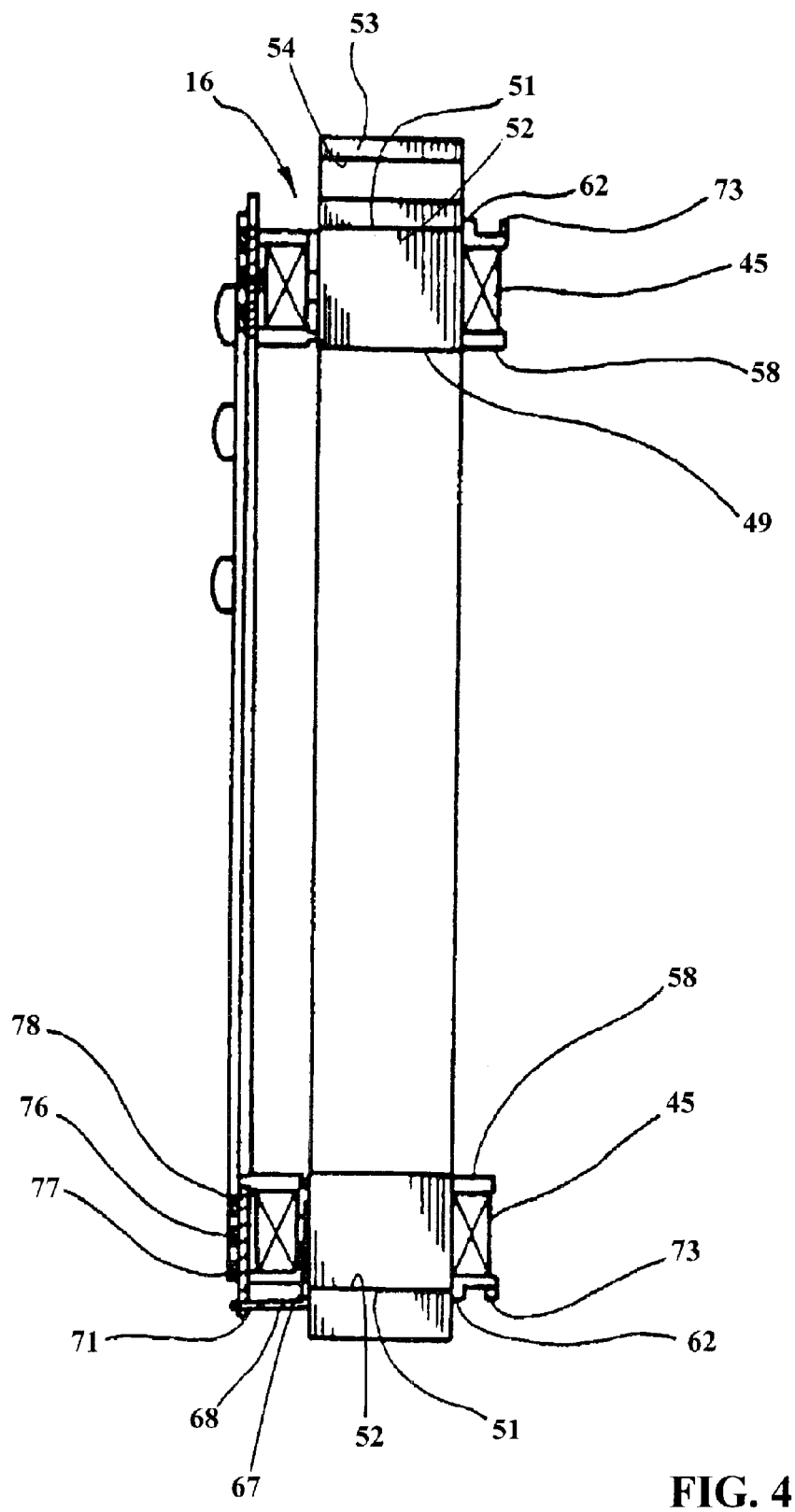
FIG. 4 is a cross sectional view of the winding assembly taken along the line 4—4 of FIG. 2.
Figure 5:
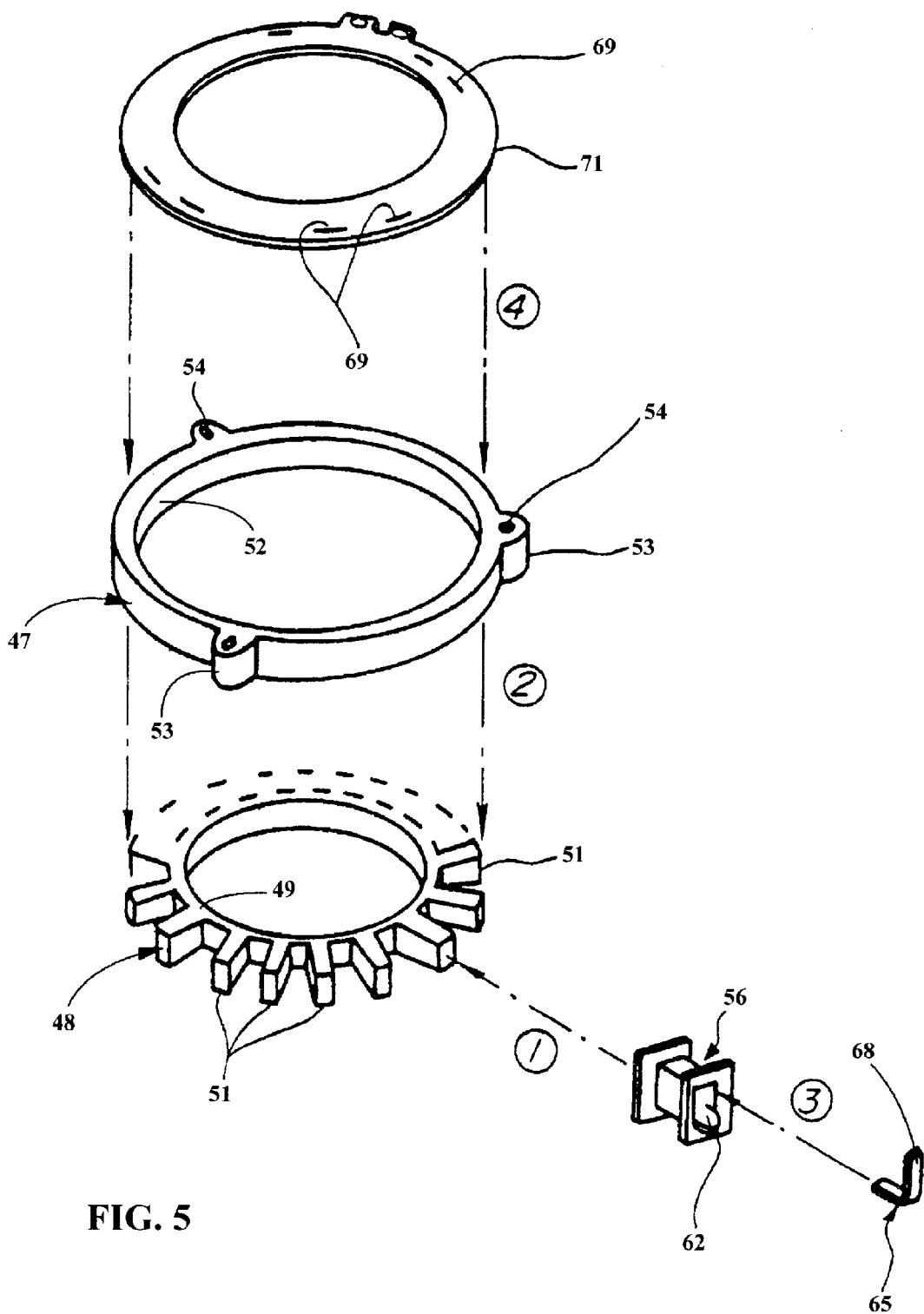
FIG. 5 is an exploded view of certain of the winding assembly elements illustrating the manner and sequence of assembly.

Referring now additionally to the remaining figures and initially primarily to FIGS. 4 and 5, the armature winding assembly 16 is comprised of a pair of ring-like elements comprised of an outer element, indicated generally by the reference numeral 47 and an inner element, indicated generally by the reference numeral 48. Both of these elements 47 and 48 are formed from a plurality of laminated sheets of material having high magnetic properties such as electromagnetic steel plates.

The inner element 48 has a hub portion 49, which forms a continuous ring from which pole teeth 51 extend radially outwardly. In a preferred embodiment there are 18 of these pole teeth 51. The outer diameter of the pole teeth 51 is preferably slightly greater than the inner diameter 52 of the outer element 47 so as to permit shrink fit attachment there between.

The outer element 47 has a plurality of lugs 53 formed thereon, each of which has an opening 54 so as to pass a threaded fastener 55 (FIG. 1) for fixation against rotation to the motor housing inner housing element 14.

Figure 6:
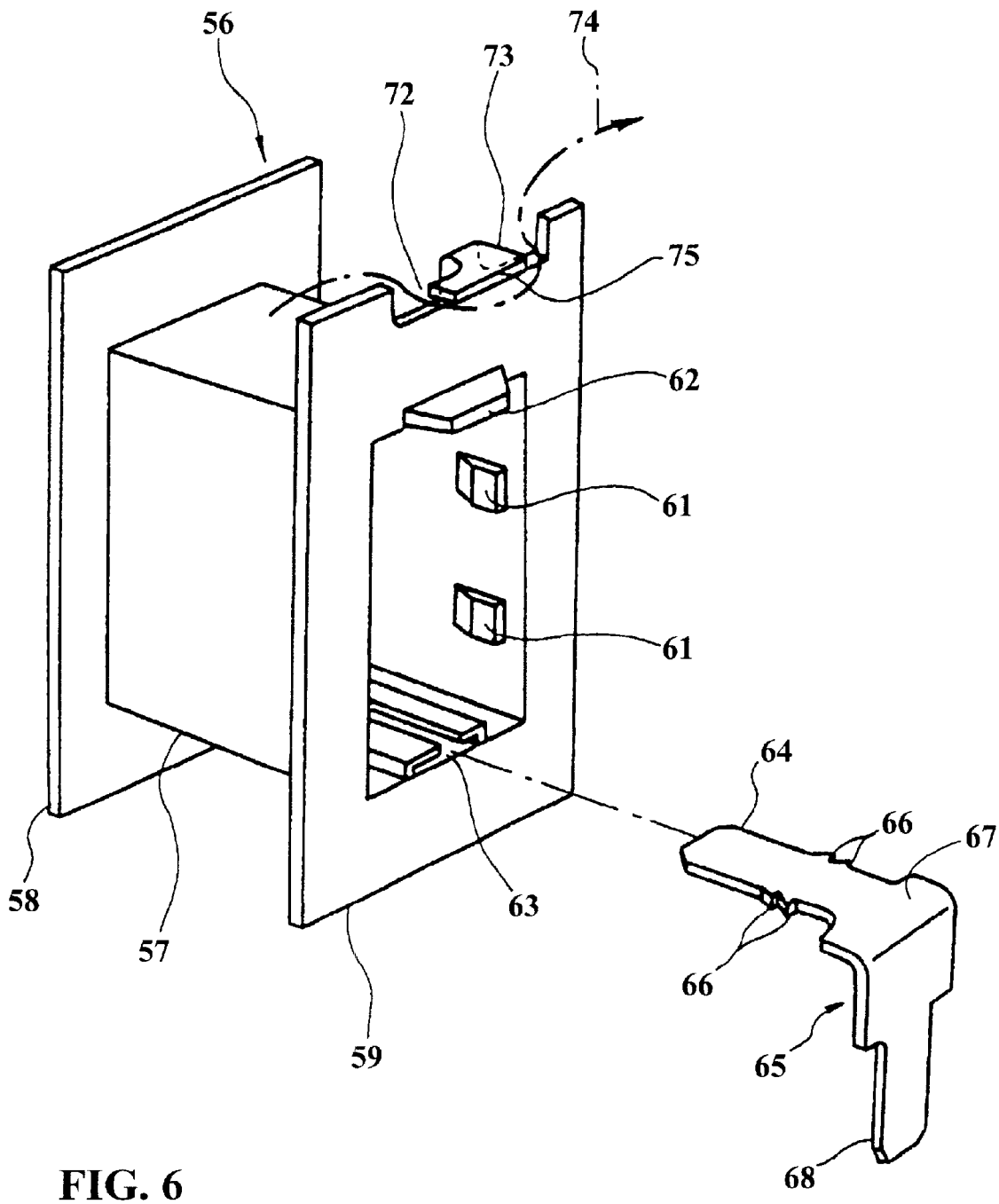
FIG. 6 is an enlarged perspective view showing the bobbins and the retaining structure associated therewith.

Bobbins, indicated generally by the reference numeral 56 and shown in most detail in FIG. 6, are provided for embracing the teeth 51 and around which individual coil windings 45 are formed, in a manner to be described. In accordance with the invention, the bobbins 56 are formed from a suitable insulating material such as a resin or the like and they comprise generally rectangular shaped tubular sections 57 which embrace the individual teeth 51 and inner and outer flanges 58 and 59. The inner flange 58 is engaged with the hub portion 49 of the inner element 48 while the outer flange 59 is spaced outwardly at the outer peripheral edge of the teeth 51.

The inner periphery of the rectangular section 57 is formed with a plurality of resilient locking teeth 61 which will snugly engage the outer periphery of the pole teeth 51 to provide good attachment thereto. In addition a key or tooth 62 is formed at one axial end of the bobbin 56 and which is designed so as to extend radially outwardly beyond the outer periphery of the pole teeth 51 and into proximity with the outer element 47 so as to engage one side thereof as clearly shown in FIG. 4 and to provide axial alignment between the inner and outer elements 47 and 48.

On the other axial side of the pole teeth 51, certain of the bobbins 56 are formed with a recess 63, which receives one leg 64 of a L-shaped retainer key 65. This retainer key 65 has barb like edges 66 so that when pressed into the recess 63 the retainer key 65 will be permanently retained in the bobbin 56. In the illustrated embodiment seven (7) of the bobbins 56 receive such retainer keys 65 for a reason that will become apparent shortly.

The leg 64 extends radially outwardly beyond the outer periphery of the pole teeth 51 as seen at 67 in FIG. 4 and engages the side of the outer element 47 opposite that engaged by the keys or teeth 62. Thus, the accurate and rigid axial positioning between the elements 47 and 48 insures good electrical and magnetic properties.

The remaining leg of the retainer key 65 is provided with elongated projections 68 for a reason, which will be described shortly. It will be seen that the elongated projections 68 extends in an axial direction radially beyond the coil windings 45 and to pass through a like number of slotted openings 69 formed in a wiring board 71. The wiring board 71 may be affixed rigidly to complete the assembly by applying solder to the projecting ends of the elongated projections 68.

The steps of assembly of the coil winding assembly can be best understood by reference to FIG. 5. First, at the step 1 the inner element 48 is positioned and the wound bobbins 56 are slid onto the teeth 51. Then at the step 2 the outer element is slipped over it and shrunk fit. This may be done by either cooling the inner element 48, heating the other outer element 47 or both and permitting these components to return to their temperature. Then, after the outer ring 47 has been shrunk onto the inner element 48, the retainer key 65 are inserted to complete the axial locking at the step 3. Then at the step 4, the wiring board is inserted and attached by the aforenoted-soldering step.

The construction of wiring board 71 and its relation to the coil windings 45 will now be described by primary reference to FIGS. 2 through 4 and 6, except as will be hereinafter noted.

Referring first to FIG. 6, it will be seen that the side of the bobbin flange 59 opposite that that receives the retainer key 65 is formed with a slotted opening 72 across which a resilient tab 73 extends. The winding end, indicated at 74 may be looped under this tab 73 by lifting its outer edge 75. Thus, the coil windings 45 will be retained tightly in place relative to the bobbin 56 both during assembly and after assembly. This avoids the likelihood that the windings can be loosened in use.

These winding ends 74 are then connected to the wiring board 71 in a manner, which will be described by primary reference to FIGS. 2 through 4.

Figure 2:
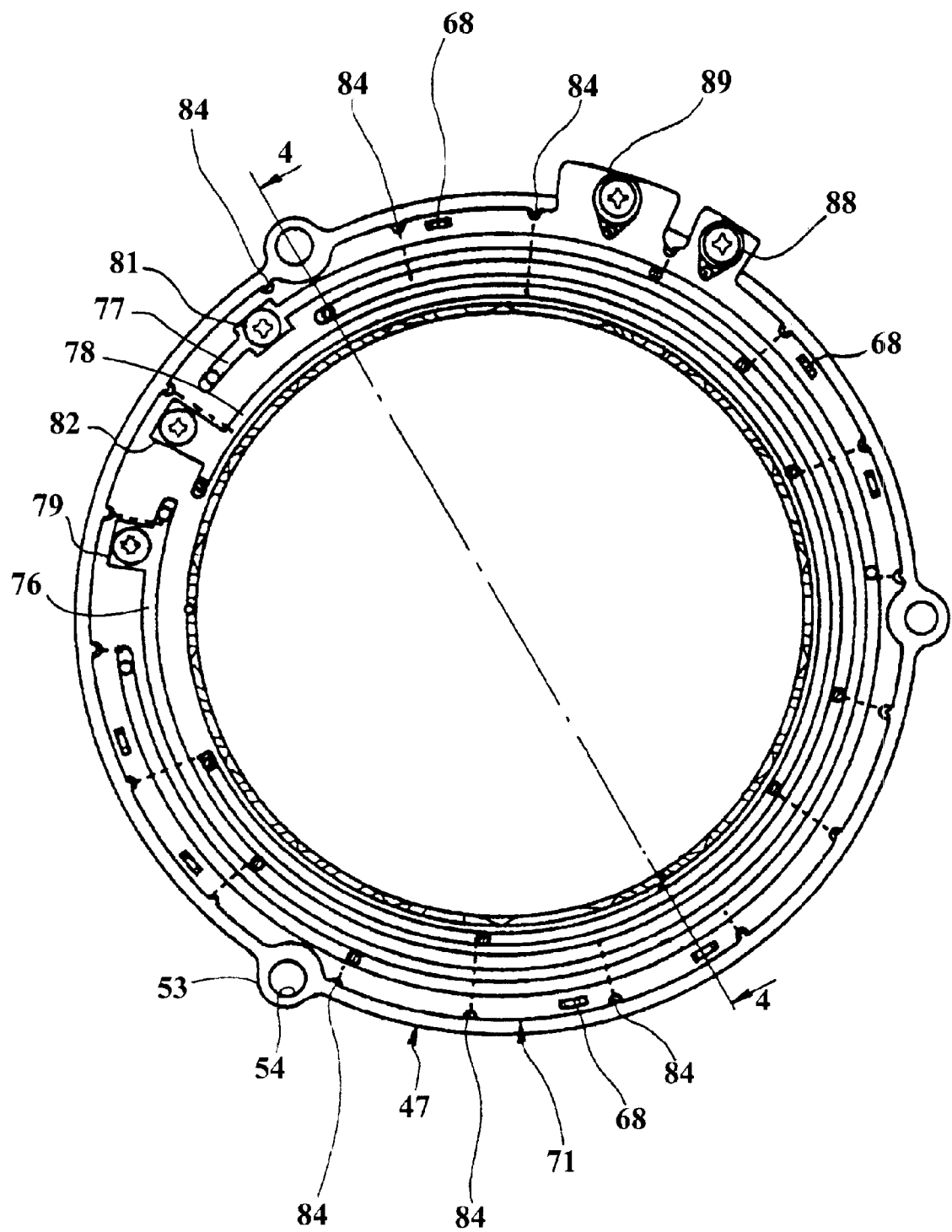
FIG. 2 is an end elevational view showing the winding assembly of the electric motor employed in the arrangement shown in FIG. 1.
Figure 3:
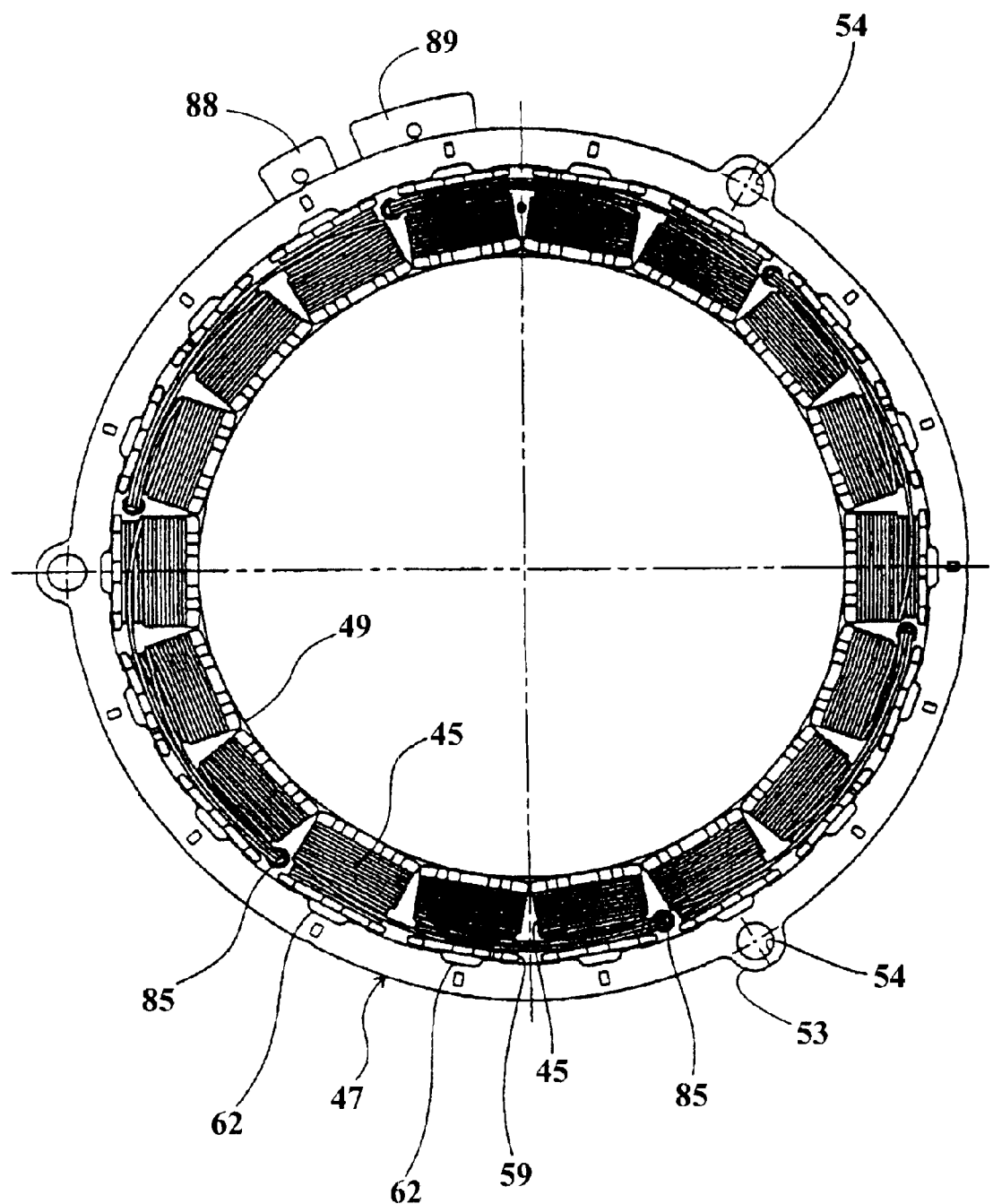
FIG. 3 is an end elevational view of the winding assembly looking in the opposite direction from FIG. 2.

Referring first to FIGS. 2 and 4, it should be noted that the coil windings 45 are connected to each other for use in a three-phase circuit having phases identified as "U", "V" and "W", each having a phase difference of 120°. Thus, on the insulating surface of the wiring board 71 there are attached three metal conductors 76, 77 and 78, each of which is associated with the respective phases "U", "V" and "W". One end of each of these strips is provided with a respective terminal end 79, 81 and 82, respectively which have grooves for attachment to an external conductor which includes a terminal box 83 (FIG. 1) mounted in the motor case assembly 13 and specifically its inner housing element 14 and which is connected to an internal wiring harness that goes to these individual conductors 76, 77 and 78.

The insulating plate of the wiring board 71 is formed with peripheral notches 84 over which the ends of the respective wires may be passed from the individual coil ends 74. As seen in FIG. 2 by the dotted lines, this shows how the individual coil windings may be connected to the respective terminal boards through conductors which may be formed either integrally with or separately attached to the insulating base.

Three coils are grouped with each set as may be seen by the dotted line views in FIG. 2 which are done for clarity so as to show how this connection is made. The remaining ends of the coil windings 45 are grouped and passed through openings in the insulating plate and which are sealed by a sealant 85 as seen in FIG. 3. The retaining structure shown in FIG. 6 facilitates the completion of this wiring upon assembly.

In addition, there is provided an angle sensor, as shown in FIG. 1 by the reference numeral 86 which cooperates with timing projections 87 formed on the rotor 17 in alignment with the respective poles for effectively switching the current flow to obtain the desired motor operation. Driving torque may be controlled by pulse controlling the "U", "V" and "W" phase currents.

Finally, the wiring board 71 is also provided with a pair of terminals 88 and 89 (FIGS. 2 and 3), which may also be connected through the wiring harness to the terminal box 83. These may be provided for temperature sensors (not shown) that detect the temperature of the stator armature assembly.

Thus, from the foregoing description it should be readily apparent that the described construction provides a very accurate way in which the windings may be assembled and formed and also how the electrical connections may be made to insure long life and good performance. Of course, the foregoing description is that of a preferred embodiment of the invention and various changes and modifications may be made without departing from the spirit and scope of the invention, as defined by the appended claims.

What is claimed is:

1. An electrical coil winding assembly for a rotating electrical machine comprising a core assembly, said core assembly being formed by annular, radially inner and radially outer elements, at least one of said core elements forming a plurality of circumferentially spaced, armature cores extending radially from one of said radially inner and radially outer elements, electrical coils wound around said armature cores, a plurality of bobbins, each surrounding a respective of said armature cores and around which said electrical coils are wound, circumferentially spaced, and radially extending interengaging parts carried by one of said radially inner and radially outer core elements engaged with a radially extending surface of the other of said radially inner and radially outer core elements for preventing axial shifting of said core elements in an axial direction relative to each other for maintaining the axial relationship between said core elements, said radially extending interengaging parts being formed at least in part by said bobbins.

2. An electrical coil winding assembly as set forth in claim 1 wherein the interengaging parts comprise a plurality of radially extending projections on one of said core elements engaged with a radially extending side face of the other of said core elements.

3. An electrical coil winding assembly as set forth in claim 1 wherein the bobbins are non-rotatably affixed to the armature cores.

4. An electrical coil winding assembly as set forth in claim 1 the bobbins are detachably connected to the armature cores by retaining clips.

5. An electrical coil winding assembly as set forth in claim 4 wherein the retaining clips also form in part the radially extending interengaging parts.

6. An electrical coil winding assembly as set forth in claim 4 wherein at least some of the retaining clips have end portions that extend in an axial direction beyond the core elements and further including a wiring plate carried by said retaining clip end portions.

7. An electrical coil winding assembly as set forth in claim 6 wherein the wiring plate comprised an insulating board to which a plurality of conductors are affixed.

8. An electrical coil winding assembly as set forth in claim 7 wherein groups of the coil windings have respective ends connected electrically to respective of the conductors.

9. An electrical coil winding assembly as set forth in claim 8 wherein the respective coil winding ends pass across locating slots formed in the periphery of the insulating board.

10. An electrical coil winding assembly as set forth in claim 9 wherein the wiring board is circular in shape.

11. An electrical coil winding assembly as set forth in claim 10 wherein the bobbins having portions forming a retainer for restraining the conductor end of the respective electric coil against movement.

12. An electrical coil winding assembly as set forth in claim 11 wherein the bobbin portions forming the retainer comprise a slot in the periphery of the bobbin for receiving the wire end and a resilient clip for retaining the wire end in said slot.

13. An electrical coil winding assembly as set forth in claim 4 wherein the bobbins having portions forming a retainer for restraining the conductor end of the respective electric coil against movement.

14. An electrical coil winding assembly as set forth in claim 13 wherein the bobbin portions forming the retainer comprise a slot in the periphery of the bobbin for receiving the wire end and a resilient clip for retaining the wire end in said slot.

* * * * *